US012578596B2

(12) United States Patent
Luo et al.

(10) Patent No.: US 12,578,596 B2
(45) Date of Patent: Mar. 17, 2026

(54) OPTICAL MODULE CONFIGURATION WITH ACCOMMODATION THROUGH OPENING FOR VARIOUS MODULATORS SUPPORTIVE OF DIFFERENT OPTICAL MODULE SPECIFICATIONS

(71) Applicant: Global Technology Inc., Ningbo (CN)

(72) Inventors: Jian-Hong Luo, Ningbo (CN); Rui Huang, Ningbo (CN); Yanrong Pan, Ningbo (CN)

(73) Assignee: Global Technology Inc., Ningbo (CN)

( * ) Notice: Subject to any disclaimer, the term of this patent is extended or adjusted under 35 U.S.C. 154(b) by 380 days.

(21) Appl. No.: 18/152,569

(22) Filed: Jan. 10, 2023

(65) Prior Publication Data

US 2024/0019723 A1     Jan. 18, 2024

(30) Foreign Application Priority Data

Jul. 15, 2022     (CN) .......................... 202210829626.8

(51) Int. Cl.
*G02F 1/035*          (2006.01)
(52) U.S. Cl.
CPC .......... *G02F 1/035* (2013.01); *G02F 2202/20* (2013.01)
(58) Field of Classification Search
CPC ..... G02F 1/035; G02F 2202/20; G02B 6/428; H04B 10/40
USPC ........................... 385/1–3; 398/135, 139, 141
See application file for complete search history.

(56) References Cited

U.S. PATENT DOCUMENTS

| | | | | |
|---|---|---|---|---|
| 9,588,312 B2 * | 3/2017 | Chang | .................... | G02B 6/426 |
| 11,977,284 B2 * | 5/2024 | Motoya | .................. | G02F 1/212 |
| 12,032,211 B1 * | 7/2024 | Reimer | .................. | G02B 6/305 |
| 2021/0278614 A1 * | 9/2021 | Kubo | .................. | G02B 6/4257 |

FOREIGN PATENT DOCUMENTS

| | | | | | |
|---|---|---|---|---|---|
| CN | 114035288 A | * | 2/2022 | ............... | G02B 6/42 |
| CN | 114578494 A | * | 6/2022 | ............... | G02B 6/42 |
| CN | 114706172 A | * | 7/2022 | ............... | G02B 6/42 |
| CN | 114706175 A | * | 7/2022 | ............... | G02B 6/42 |

OTHER PUBLICATIONS

"Integrated lithium niobate electro-optic modulators operating at CMOS-compatible voltages" by Wang et al, Nature, vol. 562, pp. 103-112 (Year: 2018).*
"Optoelectronic Integrated Circuits for Growing Datacenters: Challenge, Strategy and Evolution" by Song et al, Smart Photonic and Optoelectronic Integrated Circuits XXI, Proc. of SPIE vol. 10922, paper 109220C (Year: 2019).*

* cited by examiner

*Primary Examiner* — Robert Tavlykaev
(74) *Attorney, Agent, or Firm* — Grossman Tucker Perreault & Pfleger, PLLC

(57) ABSTRACT

An optical module configuration includes a circuit board and a transmitter optical subassembly. The circuit board includes an accommodation through opening. The transmitter optical subassembly includes a light emitting unit and a thin film LiNbOx modulator. The thin film LiNbOx modulator is optically coupled with the light emitting unit, and the thin film LiNbOx modulator is disposed in the accommodation through opening. The accommodation through opening allows placement of various thin film LiNbOx modulators supportive of different optical module specifications.

9 Claims, 7 Drawing Sheets

1a

10

110

120

112

113

111

A

OPTICAL MODULE CONFIGURATION WITH ACCOMMODATION THROUGH OPENING FOR VARIOUS MODULATORS SUPPORTIVE OF DIFFERENT OPTICAL MODULE SPECIFICATIONS

CROSS-REFERENCE TO RELATED APPLICATIONS

This application claims priority under 35 U.S.C. § 119(a) on Patent Application No(s). 202210829626.8 filed in China on Jul. 15, 2022, the entire contents of which are hereby incorporated by reference.

BACKGROUND

1. Technical Field

The present disclosure relates to optical communication, more particularly to an optical module configuration.

2. Related Art

Optical modules are generally installed in electronic communication facilities in modern high-speed communication networks. With the improvement of optical communication system and the increase in demand of wide bandwidth for various network services, a small size optical module without sacrificing both the bandwidth and transmission speed has been developed rapidly from 10G, 40G and 100G traditional optical modules to 400G and 800G higher-speed optical modules.

SUMMARY

According to one aspect of the present disclosure, an optical module configuration includes a circuit board and a transmitter optical subassembly. The circuit board includes an accommodation through opening. The transmitter optical subassembly includes a light emitting unit and a thin film lithium niobate (LiNbOx) modulator. The thin film LiNbOx modulator is optically coupled with the light emitting unit, and the thin film LiNbOx modulator is disposed in the accommodation through opening. The accommodation through opening allows the placement of various thin film LiNbOx modulators supportive of different optical module specifications.

BRIEF DESCRIPTION OF THE DRAWINGS

The present disclosure will become more fully understood from the detailed description given below and the accompanying drawings which are given by way of illustration only and thus are not intending to limit the present disclosure and wherein.

2

Figure 6:
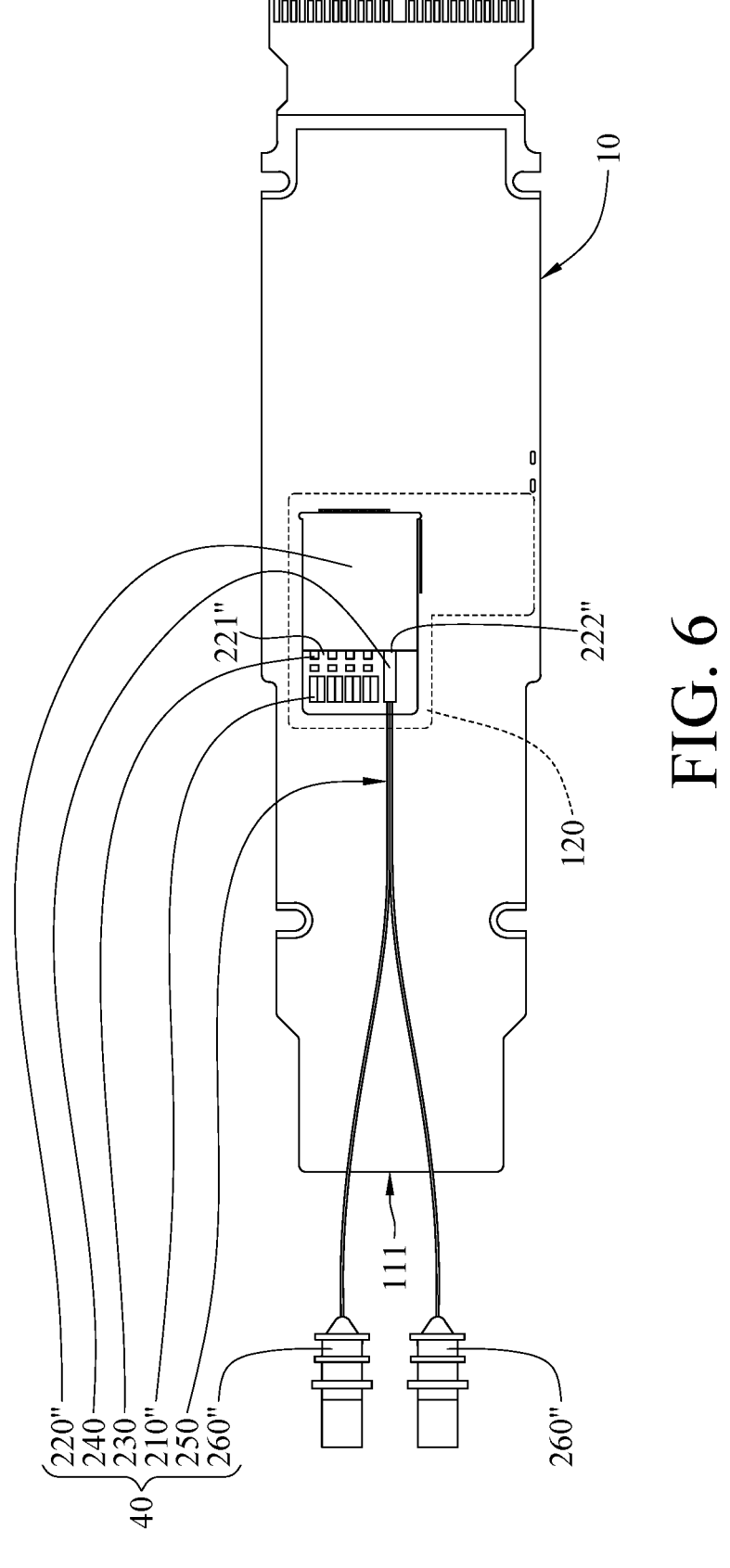
Figure 7:
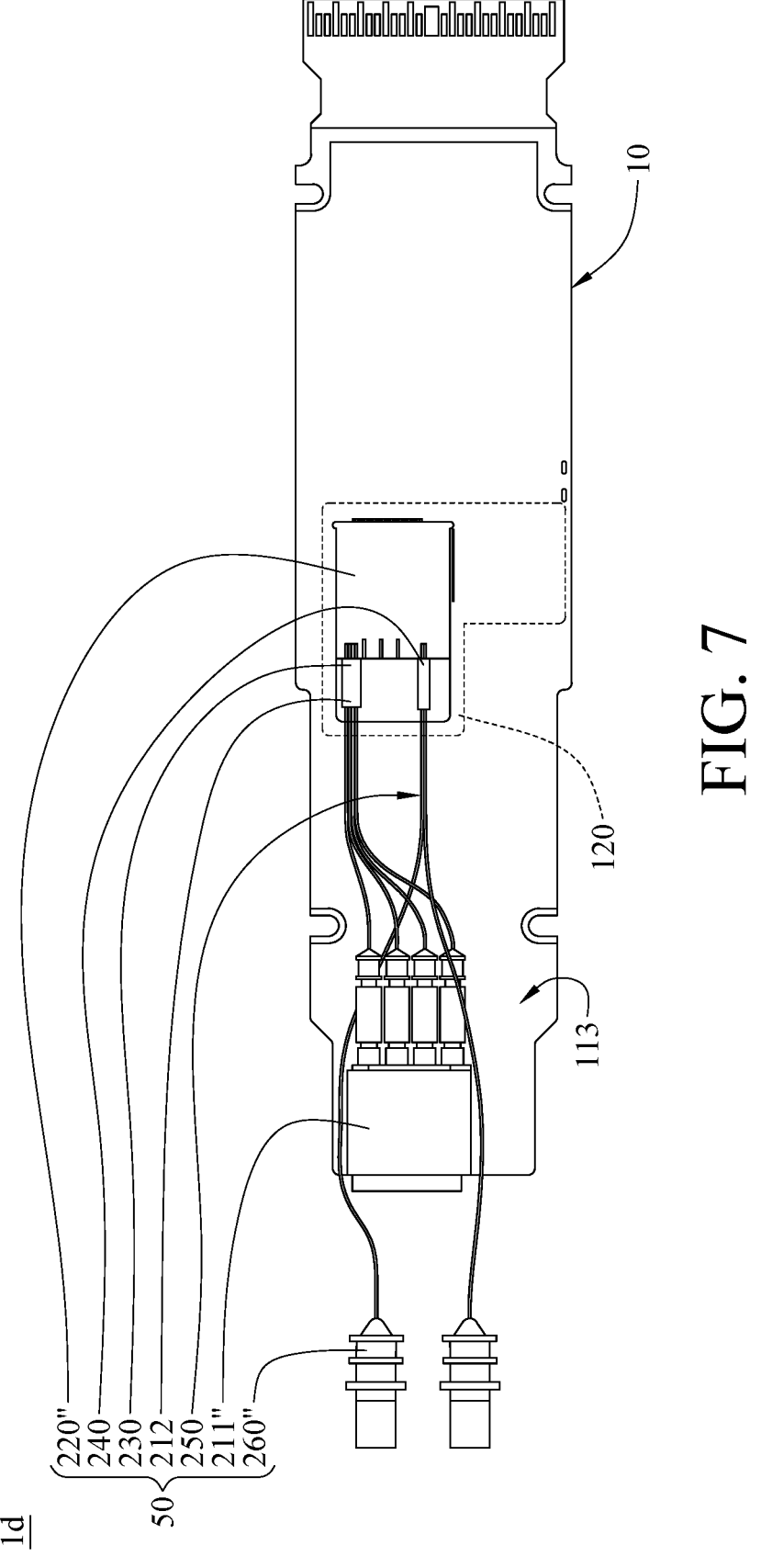

FIG. 6 is a top view of a 2×400G FR4 optical module according to one embodiment of the present disclosure; and FIG. 7 is a top view of another 2×400G FR4 optical module according to one embodiment of the present disclosure.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

With the gradual development of 5G networks, electro-absorption modulated laser (EML) is used as a mainstream laser generator in an optical module to replace direct modulated laser (DML). EML enjoys the advantage of consistent laser characteristics for long distance transmission applications (usually over 10 km). However, as to an optical module equipped with EML, the optical module is required to be designed into hermetically sealed structure due to MSA (Multi-Source Agreement), and is also required to have higher power and more complex circuit layout for the EML operation. These requirements lead to higher cost for setting up 5G base stations, thus hindering the popularization of 5G networks. Therefore, providing an optical module that features low cost and meets the requirements for long distance and high speed transmission is one of the urgent problems to be solved in this technical field.

Considering the forthcoming demand for bandwidth in networks and the cost for maintaining and building future optical communication systems, the 800G optical modules may be a better choice for long distance transmission. Recently, the International Photonics & Electronics Committee (IPEC) announced the baseline specifications for 800G DR8 and 2×400G FR4 interfaces, which basically defines the standard specifications for 800G optical modules. Since there is a slight difference between the standard specifications for 800G DR8 optical module and 2×400G FR4 optical module, two separated assembly lines for assembling elements with different specifications are used to manufacture 800G DR8 optical modules and 2×400G FR4 optical modules, respectively. For example, the circuit board in the 800G DR8 optical module assembly line has different specification from that in the 2×400G FR4 optical module assembly line. However, due to an uncertainty that which specification will become the dominant 800G optical module in the future, investing significant costs to manage two assembly lines presents a highly potential risk for business operations.

Figure 1:
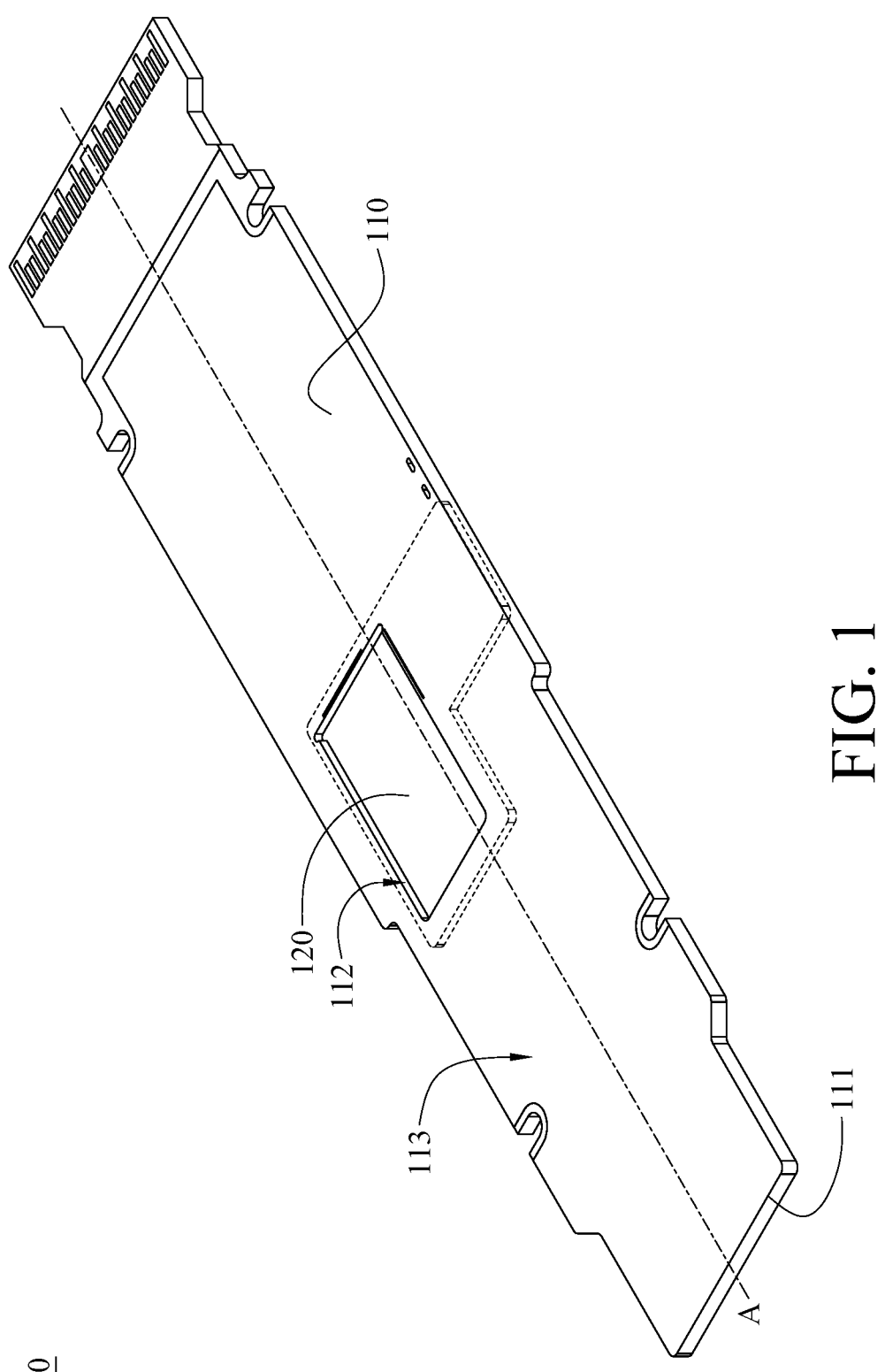
FIG. 1 is a perspective view of a circuit board for an optical module configuration according to one embodiment of the present disclosure.
Figure 2:
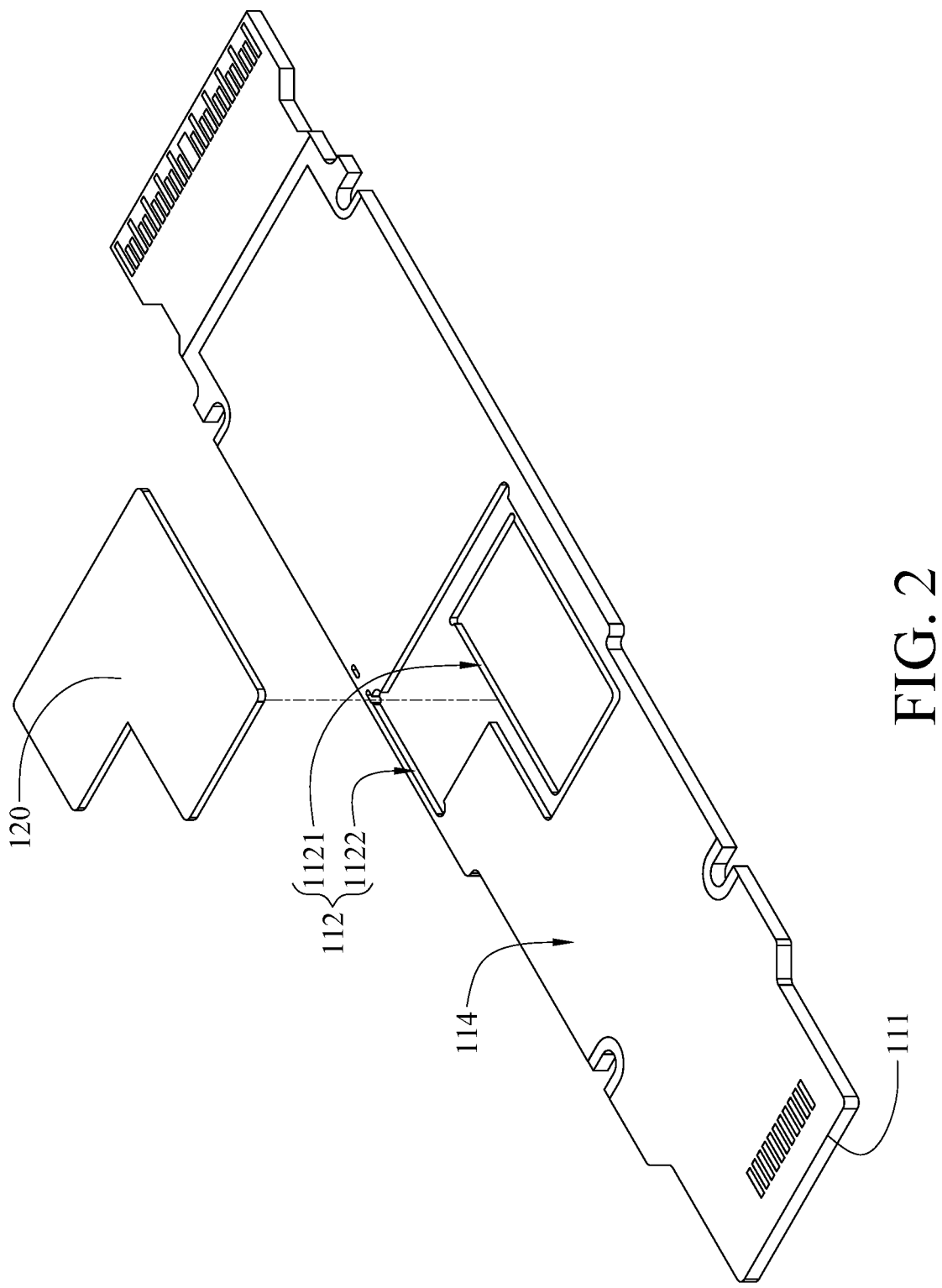
FIG. 2 is a perspective view of the circuit board in FIG. 1 showing the other side.
Figure 3:
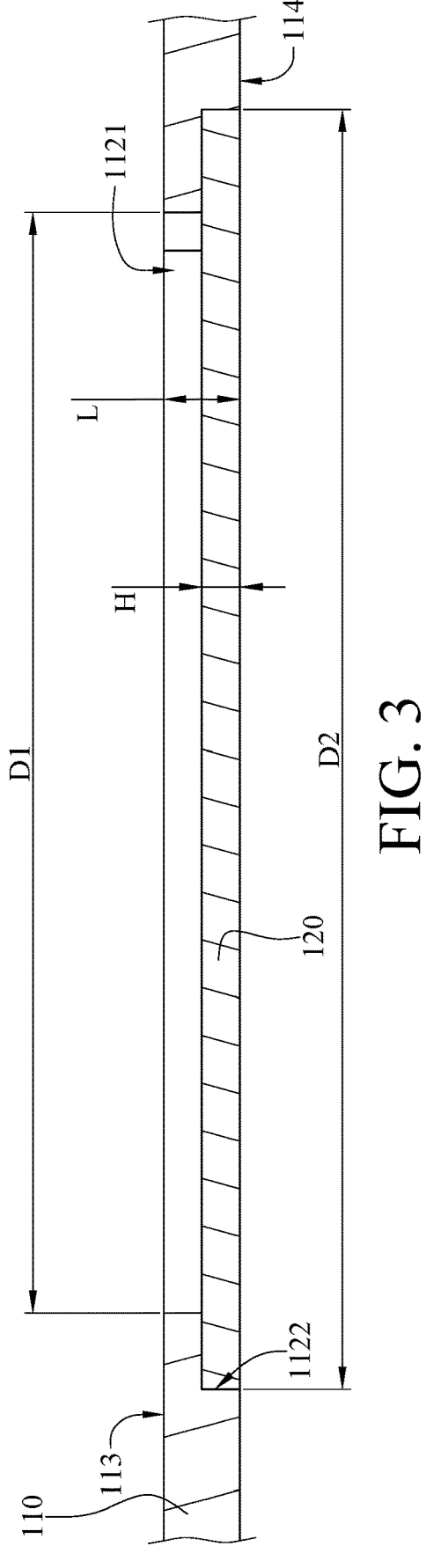
FIG. 3 is a partially cross-sectional view of the circuit board in FIG. 1.

According to one aspect of the present disclosure, an optical module configuration may include a circuit board including accommodation through opening. Please refer to FIG. 1 through FIG. 3. FIG. 1 is a perspective view of a circuit board for an optical module configuration according to one embodiment of the present disclosure, FIG. 2 is a perspective view of the circuit board in FIG. 1 showing the other side of the same, and FIG. 3 is a partially cross-sectional view of the circuit board in FIG. 1. According to one embodiment of the present disclosure, a circuit board 10 may include a main body 110 and a base 120. The main body 110 may include an optical port 111 and an accommodation through opening 112. The optical port 111 may be provided with a fiber connector or adjacent to a fiber access terminal on a housing of an optical module when the circuit board 10 is disposed on the optical module. One or more bond pads for wire bonding may be provided on one side (for example, a top surface 113) of the main body 110.

The accommodation through opening 112 may be non-coaxial with a central axis A of the main body 110 of the circuit board 10. That is, a center of the accommodation through opening 112 may be spaced apart from the central axis A by a distance along a width direction of the main body 110. The accommodation through opening 112 may include a first accommodation space 1121 and a second accommodation space 1122 connected with each other. The horizontal width D1 of the first accommodation space 1121 may be smaller than the horizontal width D2 of the second accommodation space 1122. The first accommodation space 1121 may include one end located at the top surface 113 of the main body 110, and the second accommodation space 1122 may include one end located at the bottom surface 114 of the main body 110. FIG. 1 exemplarily shows the accommodation through opening 112 including two accommodation spaces having different horizontal widths. In some embodiments, the accommodation through opening may be a through hole with single horizontal width.

The base 120 may be a metal heat sink, such as a copper board disposed in the accommodation through opening 112. More specifically, the copper board may be located in the second accommodation space 1122 of the accommodation through opening 112. The thickness H of the base 120 may be smaller than the total length L of the accommodation through opening 112. Referring to FIG. 3, the total length L of the accommodation through opening 112 may include a length of the first accommodation space 1121 along a thickness direction of the main body 110 and a length of the second accommodation space 1122 along the thickness direction of the main body 110.

FIG. 1 through FIG. 3 show a circuit board 10 applicable to 800G DR8 optical module. Please refer to FIG. 4, which shows a top view of a 800G DR8 optical module according to one embodiment of the present disclosure. According to one embodiment, an optical module configuration 1a for 800G DR8 optical module may include the aforementioned circuit board 10 and a transmitter optical subassembly 20. The transmitter optical subassembly 20 may include a built-in light emitting unit 210, a coupling lens element, an optical isolator, a thin film lithium niobate (LiNbOx) modulator 220, an input waveguide 230, an output waveguide 230, one or more pigtails 250 and a MPO connector 260. The built-in light emitting unit 210 may include two laser generators, and the bandwidth and the wavelength of each laser generator might vary from one implementation to another implementation. For example, the laser generator may be a continuous-wave laser (CW laser). The thin film LiNbOx modulator 220 may include a light receiving end 221 and a light propagation end 222 at the same side. The coupling lens element and the optical isolator may be disposed between the built-in light emitting unit 210 and the light receiving end 221 of the thin film LiNbOx modulator 220. The input waveguide 230 and the output waveguide 230 may be optically coupled with the light receiving end 221 and the light propagation end 222 of the thin film LiNbOx modulator 220, respectively. Each of the input waveguide 230 and the output waveguide 230 may be an external waveguide independent from the thin film LiNbOx modulator 220, or a built-in waveguide integrated inside the thin film LiNbOx modulator 220. The pigtail 250 and the MPO connector 260 may be disposed adjacent to the optical port 111 of the circuit board 10. The built-in light emitting unit 210 may be optically coupled with the light receiving end 221 of the thin film LiNbOx modulator 220 via the input waveguide 230, and the MPO connector 260 may be optically coupled with the light propagation end 222 of the thin film LiNbOx modulator 220 via the pigtail 250 and the output waveguide 230.

In this embodiment, the built-in light emitting unit 210, the thin film LiNbOx modulator 220, the input waveguide 230 and the output waveguide 230 may be disposed in the accommodation through opening 112. Specifically, referring to FIG. 2 through FIG. 4, the built-in light emitting unit 210, the thin film LiNbOx modulator 220, the input waveguide 230 and the output waveguide 230 may be disposed in the first accommodation space 1121 of the accommodation through opening 112. The built-in light emitting unit 210 and the thin film LiNbOx modulator 220 may be carried on the base 120. The thin film LiNbOx modulator 220 may be connected with the bond pads on the main body 110 of the circuit board 10 by wire bonding.

The built-in light emitting unit 210 emits optical signals (for example, continuous-waver signals) towards the thin film LiNbOx modulator 220. More specifically, the optical signals generated by the built-in light emitting unit 210 may transmit through the coupling lens element and the optical isolator so as to enter into the input waveguide 230, and thus the optical signals are received by the thin film LiNbOx modulator 220. The thin film LiNbOx modulator 220 can modulate the optical signals, and the modulated optical signals propagate from the thin film LiNbOx modulator 220 through the output waveguide 230, before transmitting through the pigtails 250 and the MPO connector 260 so as to be received by external optical communication components.

Figure 4:
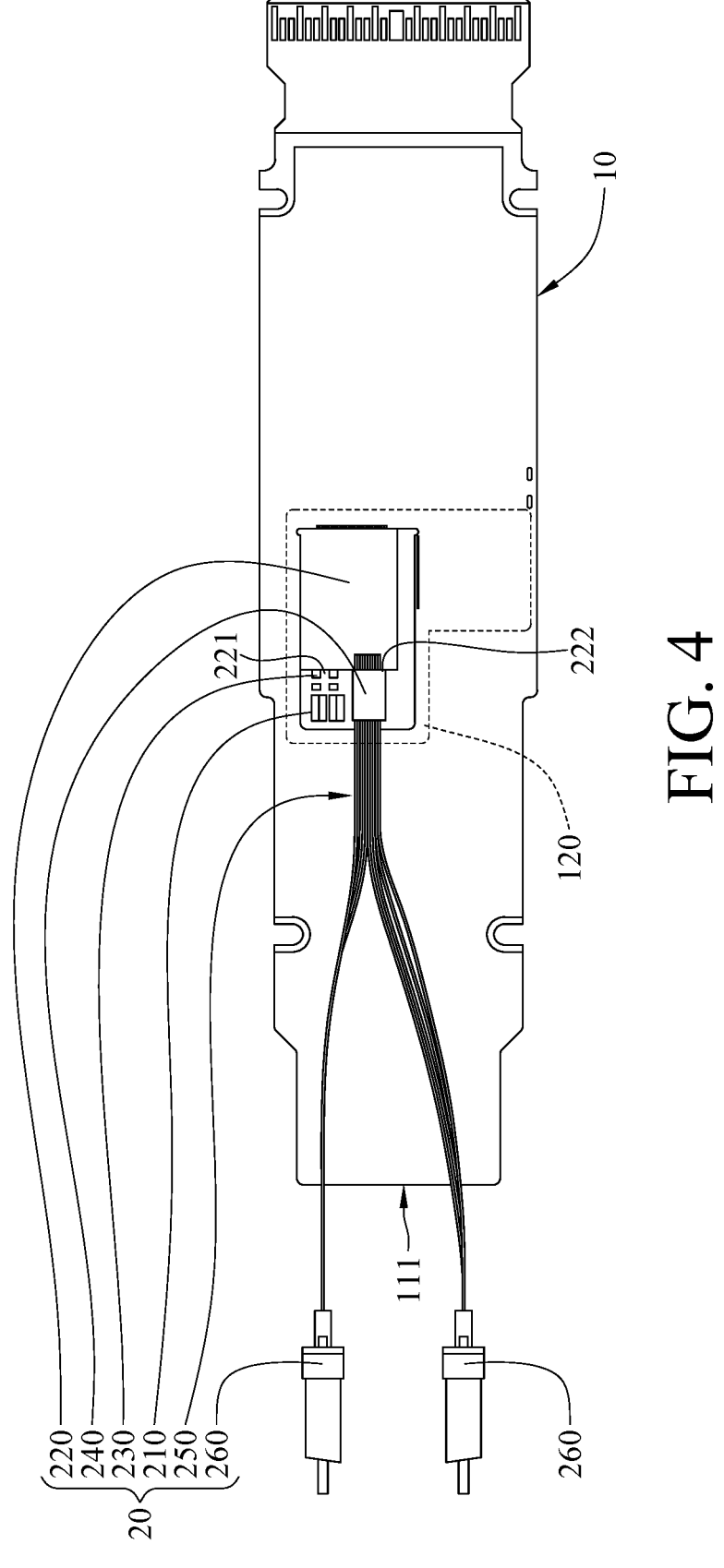
FIG. 4 is a top view of a 800G DR8 optical module according to one embodiment of the present disclosure.
Figure 5:
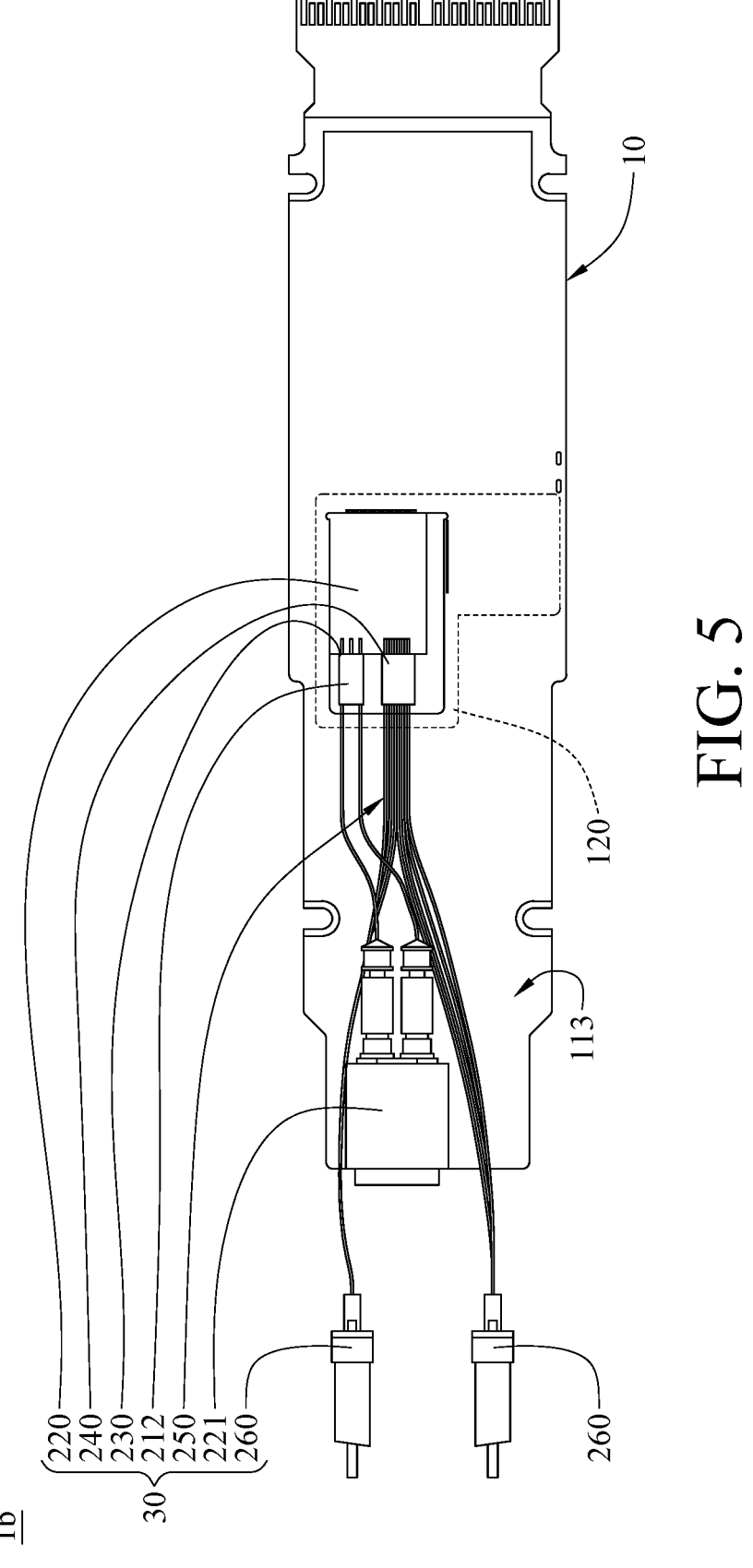
FIG. 5 is a top view of another 800G DR8 optical module according to one embodiment of the present disclosure.

FIG. 5 is a top view of another 800G DR8 optical module according to one embodiment of the present disclosure. According to one embodiment, an optical module configuration 1b for 800G DR8 optical module may include the aforementioned circuit board and a transmitter optical subassembly 30. The differences between the optical module configuration 1b and the optical module configuration 1a in FIG. 4 could be further explained in the following description.

In this embodiment, transmitter optical subassembly 30 may include an external light emitting unit 211, a fiber array 212, a coupling lens element, an optical isolator, a thin film LiNbOx modulator 220, an input waveguide 230, an output waveguide 230, a pigtail 250 and a MPO connector 260. The external light emitting unit 211 may be disposed on the top surface 113 of the main body 110 of the circuit board 10. Referring to FIG. 2, FIG. 3 and FIG. 5, the fiber array 212 may be disposed in the first accommodation space 1121 of the accommodation through opening 112, and the fiber array 212 may be optically coupled with the light receiving end 221 of the thin film LiNbOx modulator 220. The external light emitting unit 211 may include two laser generators which are optically coupled with the light receiving end 221 of the thin film LiNbOx modulator 220 via the fiber array 212 and the input waveguide 230.

The optical signals generated by the external light emitting unit 211 may transmit through the fiber array 212 before entering into the input waveguide 230, allowing for the optical signals to be received by the thin film LiNbOx modulator 220. The thin film LiNbOx modulator 220 can modulate the optical signals, and the modulated optical signals propagate from the thin film LiNbOx modulator 220 through the output waveguide 230, before transmitting through the pigtails 250 and the MPO connector 260 and being received by external optical communication components.

According to the present disclosure, the accommodation through opening 112 of the circuit board 10 in FIG. 1 through FIG. 3 allows for the placement of various thin film LiNbOx modulators supportive of different optical module specifications. Thus, in addition to FIG. 4 and FIG. 5 showing the thin film LiNbOx modulator 220 supportive of 800G optical module specification, the accommodation through opening 112 could accommodate a different thin film LiNbOx modulator supportive of another optical module specification such as a thin film LiNbOx modulator supportive of 400G optical module specification. Accordingly, the circuit board 10 is also applicable to 2×400G FR4 optical module.

Please refer to FIG. 6, which shows a top view of a 2×400G FR4 optical module according to one embodiment of the present disclosure. According to one embodiment, an optical module configuration 1c for 2×400G FR4 optical module may include the aforementioned circuit board 10 and a transmitter optical subassembly 40. The transmitter optical subassembly 40 may include a built-in light emitting unit 210", a coupling lens element, an optical isolator, a thin film LiNbOx modulator 220", an input waveguide 230, an output waveguide 230, a pigtail 250 and a LC connector 260". The built-in light emitting unit 210" may include four laser generators. For example, the built-in light emitting unit 210" may be a DFB laser diode and the like. The thin film LiNbOx modulator 220" may include a light receiving end 221" and a light propagation end 222" at the same side. The coupling lens element and the optical isolator may be disposed between the built-in light emitting unit 210" and the light receiving end 221" of the thin film LiNbOx modulator 220". The input waveguide 230 and the output waveguide 230 may be optically coupled with the light receiving end 221" and the light propagation end 222" of the thin film LiNbOx modulator 220", respectively. Each of the input waveguide 230 and the output waveguide 230 may be an external waveguide independent from the thin film LiN-bOx modulator 220", or a built-in waveguide integrated inside the thin film LiNbOx modulator 220". The pigtail 250 and the LC connector 260" may be disposed adjacent to the optical port 111 of the circuit board 10. The built-in light emitting unit 210" may be optically coupled with the light receiving end 221" of the thin film LiNbOx modulator 220" via the input waveguide 230. The LC connector 260" may be optically coupled with the light propagation end 222" of the thin film LiNbOx modulator 220" via the pigtail 250 and the output waveguide 230.

In this embodiment, the built-in light emitting unit 210", the thin film LiNbOx modulator 220", the input waveguide 230 and the output waveguide 230 may be disposed in the accommodation through opening 112. Specifically, the built-in light emitting unit 210", the thin film LiNbOx modulator 220", the input waveguide 230 and the output waveguide 230 may be disposed in the first accommodation space 1121 of the accommodation through opening 112. The built-in light emitting unit 210" and the thin film LiNbOx modulator 220" may be carried on the base 120. The thin film LiNbOx modulator 220" may be connected with the bond pads on the main body 110 of the circuit board 10 by wire bonding.

The built-in light emitting unit 210" emits optical signals (for example, continuous-waver signals) towards the thin film LiNbOx modulator 220". Specifically, the optical signals generated by the built-in light emitting unit 210" may transmit through the coupling lens element and the optical isolator so as to enter into the input waveguide 230, and thus the optical signals are received by the thin film LiNbOx modulator 220". The thin film LiNbOx modulator 220" can modulate the optical signals, and the modulated optical signals propagate from the thin film LiNbOx modulator 220" through the output waveguide 230, before transmitting through the pigtails 250 and the LC connector 260" and being received by external optical communication components.

FIG. 7 is a top view of another 2×400G FR4 optical module according to one embodiment of the present disclosure. According to one embodiment, an optical module configuration 1d for 2×400G FR4 optical module may include the aforementioned circuit board 10 and a transmitter optical subassembly 50. The differences between the optical module configuration 1d and the optical module configuration 1c in FIG. 6 are illustrated the following description.

In this embodiment, the transmitter optical subassembly 50 may include an external light emitting unit 211", a fiber array 212, a coupling lens element, an optical isolator, a thin film LiNbOx modulator 220", an input waveguide 230, an output waveguide 230, a pigtail 250 and a LC connector 260". The external light emitting unit 211" may be disposed on the top surface 113 of the main body 110 of the circuit board 10. The fiber array 212 may be disposed in the first accommodation space 1121 of the accommodation through opening 112, and the fiber array 212 may be optically coupled with the light receiving end 221" of the thin film LiNbOx modulator 220". The external light emitting unit 211" may include four laser generators, and the laser generators may be optically coupled with the light receiving end 221" of the thin film LiNbOx modulator 220" via the fiber array 212 and the input waveguide 230.

The optical signals generated by the external light emitting unit 211" may transmit through the fiber array 212 so as to enter into the input waveguide 230, before being received by the thin film LiNbOx modulator 220". The thin film LiNbOx modulator 220" can modulate the optical signals, and the modulated optical signals propagate from the thin film LiNbOx modulator 220" through the output waveguide 230, before transmitting through the pigtails 250 and the LC connector 260" and being received by external optical communication components.

According to the present disclosure, the optical module configuration includes the thin film LiNbOx modulator for modulation of the optical signals, such that the wavelength and the bandwidth of the modulated optical signals can meet the requirements for long distance and high speed optical communication applications. Thus, instead of EML for conventional applications, the laser generator in the optical module configuration with lower cost and fewer energy consumption, such as CW laser, could be utilized. Also, the optical signals modulated by the thin film LiNbOx modulator is helpful to prevent low quality transmission in long distance and high speed optical communication applications.

Moreover, according to the present disclosure, the circuit board for optical module configuration includes the accommodation through opening. The accommodation through opening allows for the placement of various thin film LiNbOx modulators supportive of different optical module specifications. For example, the circuit board can be used as an element in a 800G DR8 optical module since the accommodation through opening can accommodate a small-sized thin-film LiNbOx modulator supportive of the 800G optical module specification, while the same circuit board can also be used as an element in a 2×400G FR4 optical module since the accommodation through opening thereof can accommodate large-sized thin-film LiNbOx modulator supportive of the 400G optical module specification. The circuit board of the present disclosure with single specification enables the installation of thin-film LiNbOx modulators for different optical module specifications, such that the circuit board can be used for the production of both 800G DR8 optical module and 2×400G FR4 optical module. Accordingly, the 800G DR8 optical module and the 2×400G FR4 optical module can be manufactured in a single assembly line, allowing for the production of optical modules with different specifications to be realized in a quick and cost effective manner, which undoubtedly would help reduce manufacturing costs. In practice, in order to allow the accommodation through opening to accommodate large-sized thin-film LiNbOx modulator supportive of 400G optical module and multiple built-in light emitting units, the dimensions of the accommodation through opening may be with a length of 14.0 millimeters (mm) and a width of 8.0 mm.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical module configuration, comprising:
a circuit board comprising an accommodation through opening extending through the circuit board, wherein the circuit board comprises a main body comprising the accommodation through opening and a base disposed in the accommodation through opening, wherein the base has a smaller thickness than a total length of the accommodation through opening; and
a transmitter optical subassembly, comprising a light emitting unit and a thin film lithium niobate (LiNbOx) modulator carried on the base, the thin film LiNbOx modulator being optically coupled with the light emitting unit, and the thin film LiNbOx modulator being disposed in the accommodation through opening;
wherein the thin film LiNbOx modulator is a first thin film LiNbOx modulator or a second thin film LiNbOx modulator, and the second thin film LiNbOx modulator has a shorter length in a direction orthogonal to a central axis of the circuit board than a length of the first thin film LiNbOx modulator;
wherein, the accommodation through opening allows placement of one of the first and second thin film LiNbOx modulators, and wherein the main body defines a first accommodation space and a second accommodation space arranged along a thickness direction of the circuit board, the first accommodation space and the second accommodation space have different horizontal widths, the thin film LiNbOx modulator is in the first accommodation space, and the base is in the second accommodation space.

2. The optical module configuration according to claim 1, wherein the base is made of metal.

3. The optical module configuration according to claim 1, wherein the accommodation through opening is non-coaxial with a central axis of the circuit board.

4. The optical module configuration according to claim 1, wherein a length of the accommodation through opening is 14.0 mm, and a width of the accommodation through opening is 8.0 mm.

5. The optical module configuration according to claim 1, wherein the transmitter optical subassembly further comprises an input waveguide disposed in the accommodation through opening, and the input waveguide is optically coupled with a light receiving end of the thin film LiNbOx modulator.

6. The optical module configuration according to claim 1, wherein the transmitter optical subassembly further comprises an output waveguide disposed in the accommodation through opening, and the output waveguide is optically coupled with a light propagation end of the thin film LiNbOx modulator.

7. The optical module configuration according to claim 1, wherein the thin film LiNbOx modulator comprises a light receiving end and a light propagation end at a same side.

8. The optical module configuration according to claim 1, wherein the transmitter optical subassembly further comprises a fiber array disposed in the accommodation through opening, and the fiber array is optically coupled with a light receiving end of the thin film LiNbOx modulator.

9. The optical module configuration according to claim 1, wherein the first accommodation space includes the accommodation through opening extending through the circuit board, and wherein the second accommodation space does not extend through the circuit board.

* * * * *